US012230440B2

(12) United States Patent
Seng et al.

(10) Patent No.: US 12,230,440 B2
(45) Date of Patent: Feb. 18, 2025

(54) MAGNETIC LATCHING ACTUATOR

(71) Applicant: S&C Electric Company, Chicago, IL (US)

(72) Inventors: Nicholas Seng, Chicago, IL (US); Alejandro Montenegro, Chicago, IL (US); John French, Chicago, IL (US); Thomas S. Kelley, Highland Park, IL (US); Keith W. Benson, Chicago, IL (US); Robert E. Sroka, Arlington Heights, IL (US); Michael Quinlan, Chicago, IL (US); Gabrielle Madden, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 52 days.

(21) Appl. No.: 17/853,969

(22) Filed: Jun. 30, 2022

(65) Prior Publication Data

US 2023/0011724 A1 Jan. 12, 2023

Related U.S. Application Data

(60) Provisional application No. 63/220,289, filed on Jul. 9, 2021.

(51) Int. Cl.
*H01F 7/16* (2006.01)

(52) U.S. Cl.
CPC ... *H01F 7/1646* (2013.01); *H01F 2007/1669* (2013.01); *H01F 2007/1692* (2013.01)

(58) Field of Classification Search
CPC ........... H01F 7/1646; H01F 2007/1669; H01F 2007/1692; H01F 7/124; H01F 7/1615; H01H 3/28; H01H 33/6662
See application file for complete search history.

(56) References Cited

U.S. PATENT DOCUMENTS

| | | | | |
|---|---|---|---|---|
| 10,923,298 | B1 * | 2/2021 | Chen | H01H 33/6662 |
| 10,923,304 | B1 * | 2/2021 | Juds | H01H 51/01 |
| 2008/0266733 | A1 * | 10/2008 | O'Leary | H01H 75/04 361/71 |

* cited by examiner

*Primary Examiner* — Bernard Rojas

(57) ABSTRACT

An actuator assembly including a first actuator having a first magnetically actuated plunger and a first latching plate, where the first plunger is operable to be magnetically latched to the first latching plate. The actuator assembly further includes a second actuator coupled to and axially aligned with the first actuator. The second actuator includes a second magnetically actuated plunger, a second latching plate, a sleeve positioned within and extending from the second plunger and being rigidly secured to the first plunger, and a tolerance spring wrapped around the sleeve. The second plunger is operable to be magnetically latched to the second latching plate, where latching of the second plunger causes the tolerance spring to compress and provide additional latching force of the first plunger to the first latching plate.

14 Claims, 2 Drawing Sheets

MAGNETIC LATCHING ACTUATOR

CROSS-REFERENCE TO RELATED APPLICATION

This application claims the benefit of priority from the U.S. Provisional Application No. 63/220,289, filed on Jul. 9, 2021, the disclosure of which is hereby expressly incorporated herein by reference for all purposes.

BACKGROUND

Field

This disclosure relates generally to a magnetic actuator assembly and, more particularly, to a magnetic actuator assembly that includes at least two coupled and axially aligned magnetic actuators.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeders that carry the same current, but are 120° apart in phase. three-phase and single phase lateral lines are tapped off of the feeder that provide the medium voltage to various distribution transformers, where the voltage is stepped down to a low voltage and is provided to loads, such as homes, businesses, etc.

Power distribution networks of the type referred to above typically include switching devices, breakers, reclosers, current interrupters, etc. that control the flow of power throughout the network. Vacuum interrupters are typically employed in many types of these devices to provide load and fault current interruption and often employ magnetic actuators. A vacuum interrupter typically includes a cylindrical insulator usually a ceramic and end caps sealed to the ends of the insulator to form a vacuum chamber or bottle. A fixed contact is electrically coupled to and extends through one of the end caps into the vacuum chamber and a movable contact is electrically coupled to and extends through the other end cap into vacuum chamber. When the contacts are in contact with each other current can flow through the vacuum interrupter. When the movable contact is moved away from the fixed contact, such as under a spring force, a plasma arc is created between the contacts that is quickly extinguished by the vacuum through a zero current crossing. The separated contacts in vacuum provides dielectric strength that exceeds power system voltage and prevents current flow, and the insulator prevents current flow between the end caps outside of the contacts.

The magnetic actuator in these types of devices typically have an armature or plunger that is moved by an electrical winding wound on a stator to open and close the vacuum interrupter contacts, where the plunger and the stator provide a magnetic path for the magnetic flux produced by the winding, and where the plunger is coupled to the movable contact. In one design, when the actuator is controlled to close the vacuum interrupter, the winding is energized by current flowing in one direction, which causes the plunger to move and seat against a latching plate. The current is then turned off to de-energize the coil and permanent magnets hold the plunger against the latching plate and against a compression force of an opening spring. When the actuator is controlled to open the vacuum interrupter, the winding is energized by current flowing in the opposite direction, which breaks the latching force of the permanent magnets and allows the opening spring to open the vacuum interrupter. A compliance spring is provided in addition to the opening spring to provide an additional opening force at the beginning of the opening process so as to break the weld on the interrupter contacts.

For a particular plunger material, such as steel, the latching force of the plunger against the latching plate is proportional to the latching area of the plunger. In some applications the amount of latching force required for the application causes the diameter of the plunger to have to be increased beyond the space available for the actuator. Better magnetic materials can be employed for use as the plunger that provide greater magnetic forces for a given latching area, but those materials are often costly, which often prevents them from being used.

SUMMARY

The following discussion discloses and describes a magnetic actuator assembly including a first actuator having a first annular latching plate, a first annular stator, a first winding wound on the first stator, a first plunger slidably positioned in a central opening within the first stator and an opening spring positioned between the first plunger and the stator, where current flow in one direction through the first winding causes the first plunger to seat against the first latching plate. The actuator assembly further includes a second actuator coupled to and axially aligned with the first actuator. The second actuator includes a second annular latching plate, a second annular stator, a second winding wound on the second stator, and a second plunger slidably positioned in an opening within the second stator. The second actuator further includes a first sleeve positioned within a first channel in the second plunger and extending from a back portion of the second plunger through an opening in the first latching plate and being rigidly secured to the first plunger, and a tolerance spring wrapped around the first sleeve and being positioned in the first channel between the back portion of the second plunger and a flange at an opposite end of the first sleeve from the back portion. Current flow in one direction through the second winding causes the second plunger to seat against the second latching plate and cause the tolerance spring to compress between the back portion of the second plunger and the flange to provide additional latching force of the first plunger against the first latching plate.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a magnetic actuator assembly that includes at least two coupled and axially aligned magnetic actuators is merely exemplary in nature, and is in no way intended to limit the disclosure or its applications or uses. For example, the discussion herein refers to the actuator assembly being applicable for switching a vacuum interrupter, for example, in a single-phase self-powered magnetically actuated fault recloser for use in medium voltage power distribution networks. However, as will be appreciated by those skilled in the art, the actuator assembly will have other applications.

Figure 1:
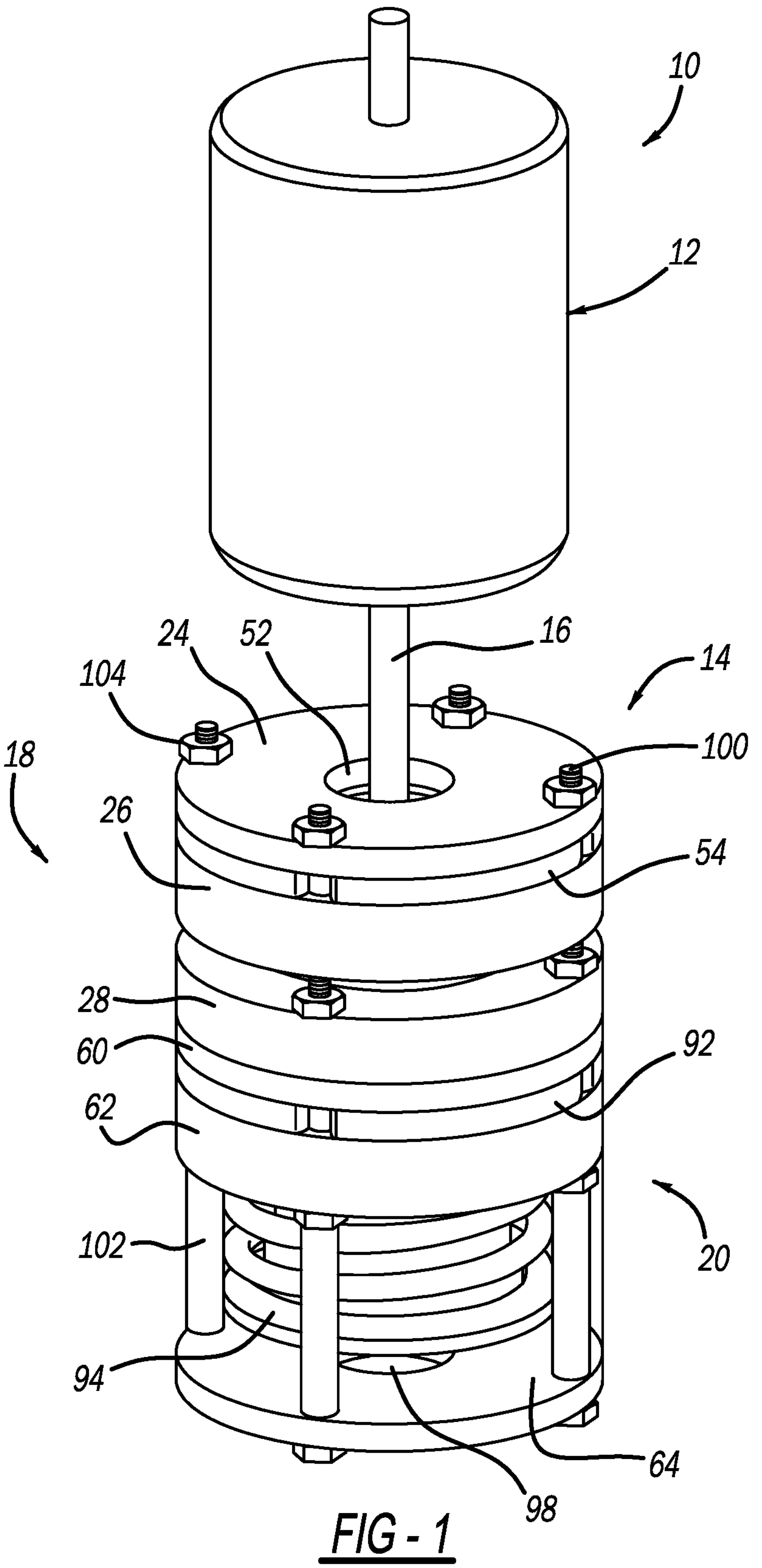
FIG. 1 is an isometric view of a magnetically actuated switch assembly including a vacuum interrupter and magnetic actuator assembly.
Figure 2:
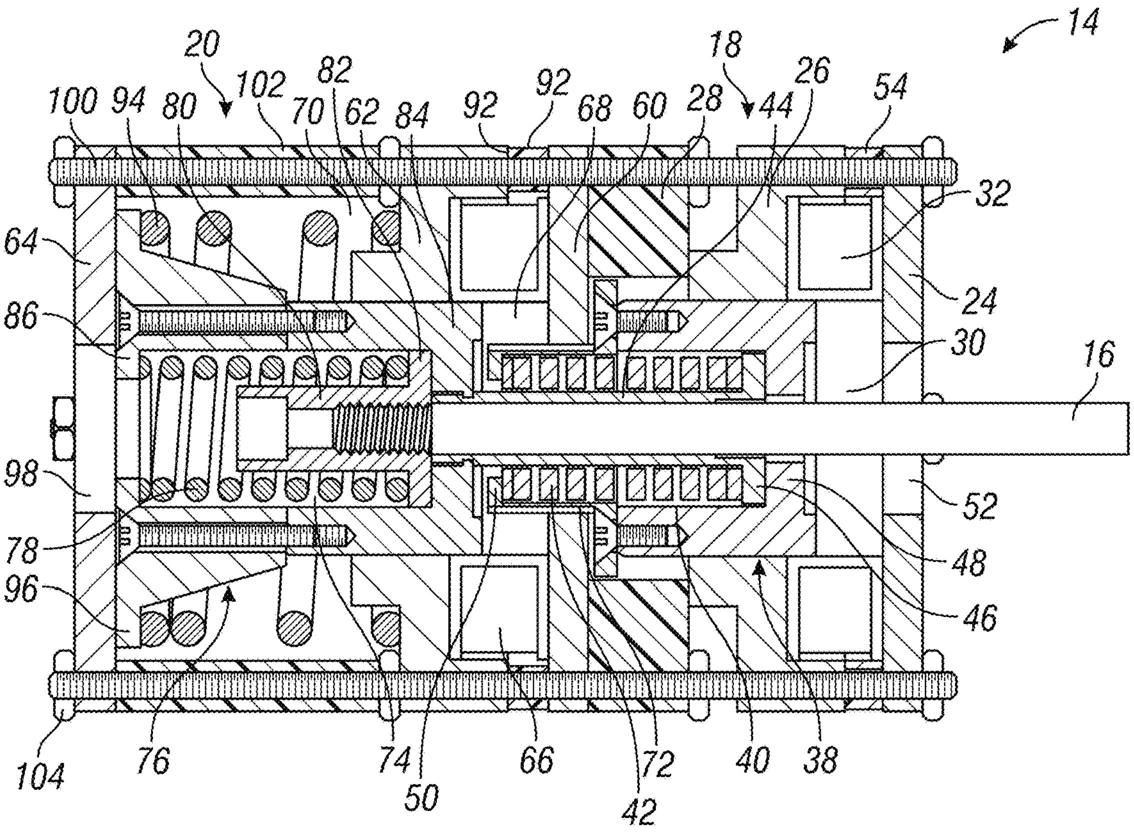
FIG. 2 is a cross-sectional view of the magnetic actuator assembly shown in FIG. 1 in an open position.
Figure 3:
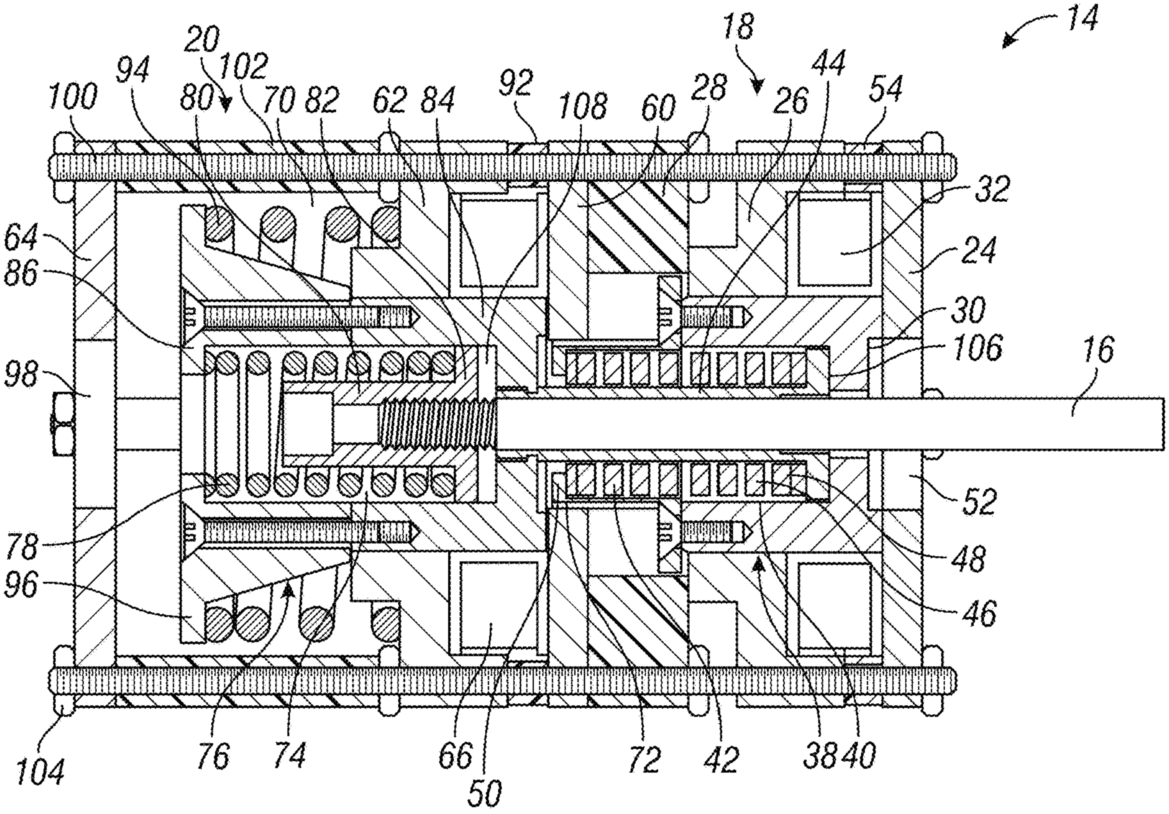
FIG. 3 is a cross-sectional view of the magnetic actuator assembly shown in FIG. 1 in a closed position.

FIG. 1 is an isometric view of a magnetically actuated switch assembly 10 including a vacuum interrupter 12 coupled to a magnetic actuator assembly 14 that electrically opens and closes the vacuum interrupter 12 by actuating a drive rod 16. The switch assembly 10 has particular application for use in a single-phase self-powered magnetically actuated fault recloser for use in medium voltage power distribution networks. FIG. 2 is a cross-sectional view of the actuator assembly 14 in an open position and FIG. 3 is a cross-sectional view of the actuator assembly 14 in a closed position. As will be discussed in detail below, the actuator assembly 14 includes two magnetic actuators 18 and 20 coupled together and axially aligned in series to provide an increased latching force without having to increase the diameter of the assembly 14. It is noted that although the discussion herein refers to two stacked actuators, the same principles apply to stacking more than two actuators.

The actuator 18 includes an annular top plate 24, an annular stator 26 and an annular spacer member 28, where a coil 32 is wound on the stator 26 and where the plate 24 and the stator 26 define a central opening 30. The actuator 18 also includes a slidable plunger 38 slidably positioned within the opening 30. The plunger 38 includes a central channel 40 in which is positioned a tolerance spring 42 wrapped around a sleeve 44, where the sleeve 44 is slidable in the channel 40. The sleeve 44 includes a front flange 46 positioned adjacent to a front portion 48 of the plunger 38 that extends out of a back portion 50 of the plunger 38, where the spring 42 is positioned between the back portion 50 and the flange 46. The rod 16 extends through a central hole 52 in the top plate 24 into the opening 30 and through the sleeve 44. The actuator 18 further includes four semi-annular permanent magnets 54 spaced apart and positioned between the plate 24 and the stator 26.

The actuator 20 includes an annular top plate 60, an annular stator 62 and an annular bottom plate 64, where a coil 66 is wound on the stator 62, an open area 70 is provided between the stator 62 and the bottom plate 64, and the plate 60 and the stator 62 define a central opening 68. The back portion 50 of the plunger 38 extends through a central hole 72 in the top plate 60 and into the opening 68 when the assembly 14 is in the open position. The actuator 20 also includes a slidable plunger 76 slidably positioned within the opening 68 and the open area 70. The plunger 76 includes a central channel 74 in which is positioned a compliance spring 78 wrapped around a sleeve 80. The sleeve 80 includes a front flange 82 positioned adjacent to a front portion 84 of the plunger 76, where the spring 78 is positioned between a back portion 86 of the plunger 76 and the flange 82. The sleeve 80 is slidable in the channel 74, the plunger 76 is rigidly secured to the sleeve 44, and the rod 16 is threaded into the sleeve 80. The actuator 20 further includes four semi-annular permanent magnets 92 spaced apart and positioned between the plate 60 and the stator 62 and an opening spring 94 positioned between the stator 62 and a bottom flange 96 of the plunger 76, where the flange 96 surrounds a central hole 98 in the bottom plate 64.

Four bolts 100 extend the length of the actuator assembly 14 and extend through holes in the top plate 24, the stator 26, the spacer member 28, the top plate 60, the stator 62, sleeves 102 that cross the open area 70 and the bottom plate 64. Several nuts 104 are threaded onto the bolts 100 at strategic locations to hold the assembly 14 together.

As will be discussed below, when the actuator assembly 14 is in the closed position as shown in FIG. 3, the latching force between the plunger 76 and the plate 60 and the latching force between the plunger 38 and the plate 24 increases the overall latching force of the actuator assembly 14 beyond a single magnetic actuator without increasing the diameter of the actuator assembly 14 over that of the single actuator. In order to operate effectively without the tolerance spring 42, the plunger 76 would need to contact the plate 60 at the same time that the plunger 38 contacts the plate 24 when the actuator assembly 14 is moved to the closed position. In other words, in order for the actuator assembly 14 to achieve a maximum holding force, both of the plungers 38 and 76 must fully seat on their respective latching plates 24 and 60. However, it is difficult to fabricate the parts in the actuator assembly 14 with the tolerances required to do that.

When the actuator assembly 14 is in the open position as shown in FIG. 2, the sleeve 80 is positioned against the front portion 84 of the plunger 76 under the bias of the compliance spring 78 and the sleeve 44 is positioned against the front portion 48 of the plunger 38 under the bias of the tolerance spring 42. When the actuator assembly 14 is commanded to close the vacuum interrupter 12, current is simultaneously applied to the coils 32 and 66 which creates magnetic flux in the stators 26 and 62, respectively, which draws the plunger 76 towards the plate 60 and the plunger 38 towards the plate 24 against the bias of the opening spring 94, which is compressed between the stator 62 and the flange 96. When the plunger 76 contacts the plate 60, the latching force provided by the magnetic flux holds the rod 16 in the closed position. Additionally, the length of the sleeve 44 is set so that when the plunger 76 is latched to the plate 60 and the plunger 38 is latched to the plate 24 a gap 106 in the channel 40 is created between the flange 46 and the front portion 48 of the plunger 38, which causes the spring 42 to compress between the back portion 50 of the plunger 38 and the flange 46, which provides additional latching force of the plunger 76 against the plate 60 as a result of the spring 42 pushing against the flange 46. The latching of the plunger 76 to the plate 60 also causes the spring 78 to compress between the flange 82 and the back portion 86 of the plunger 76, which creates a gap 108 in the channel 74 between the flange 82 and the front portion 84 of the plunger 76.

Once the interrupter 12 is closed the current to the coils 32 and 66 is turned off and the magnets 54 and 92 hold the plungers 38 and 76 in the latched position with the open spring 94, the compliance spring 78 and the tolerance spring 42 under compression. When the vacuum interrupter 12 is opened, current is provided to the coils 32 and 66 in the opposite direction, which breaks the magnetic hold on the plungers 38 and 66 and the opening spring 94 pushes the plunger 76 away from the plate 60 and the sleeve 44 pushes the plunger 38 away from the plate 24. The compliance spring 78 provides an additional initial opening force against the back portion 86 of the plunger 76 to help break the weld of the contacts in the vacuum interrupter 12.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An actuator assembly comprising:

a first actuator including a first annular latching plate, a first annular stator, a first winding wound on the first stator, a first plunger slidably positioned in a central opening within the first stator and an opening spring positioned between the first plunger and the stator, wherein current flow in one direction through the first winding causes the first plunger to seat against the first latching plate; and a second actuator coupled to and axially aligned with the first actuator, the second actuator including a second annular latching plate, a second annular stator, a second winding wound on the second stator, a second plunger slidably positioned in an opening within the second stator, a first sleeve positioned within a first channel in the second plunger and extending from a back portion of the second plunger through an opening in the first latching plate and being rigidly secured to the first plunger, and a tolerance spring wrapped around the first sleeve and being positioned in the first channel between the back portion of the second plunger and a first flange feature of the first sleeve positioned at an opposite end of the first sleeve from the back portion of the second plunger, wherein current flow in one direction through the second winding causes the second plunger to seat against the second latching plate and cause the tolerance spring to compress between the back portion of the second plunger and the first flange to provide additional latching force of the first plunger against the first latching plate.

2. The actuator assembly according to claim 1 wherein the first actuator includes a second sleeve positioned within a second channel in the first plunger and a compliance spring wrapped around the second sleeve and being positioned in the second channel between a back portion of the first plunger and a second flange feature of the second sleeve at an opposite end of the second sleeve from the back portion of the first plunger, wherein when the first plunger seats against the first latching plate the compliance spring compresses between the back portion of the first plunger and the second flange.

3. The actuator assembly according to claim 2 further comprising a drive rod rigidly secured to the second sleeve and extending through the first sleeve, an opening in the second plunger and an opening in the second latch plate.

4. The actuator assembly according to claim 3 wherein the drive rod is coupled to a switch.

5. The actuator assembly according to claim 4 wherein the switch is a vacuum interrupter.

6. The actuator assembly according to claim 1 wherein the first actuator includes a plurality of semi-annular permanent magnets positioned between the first latching plate and the first stator and the second actuator includes a plurality of semi-annular permanent magnets positioned between the second latching plate and the second stator.

7. An actuator assembly comprising:

a first actuator including a first magnetically actuated plunger and a first latching plate, the first plunger operable to be magnetically latched to the first latching plate; and a second actuator coupled to and axially aligned with the first actuator, the second actuator including a second magnetically actuated plunger, a second latching plate, a sleeve positioned within and extending from the second plunger and being rigidly secured to the first plunger, and a tolerance spring wrapped around the sleeve, the second plunger operable to be magnetically latched to the second latching plate, wherein latching of the second plunger causes the tolerance spring to compress and provide additional latching force of the first plunger to the first latching plate.

8. The actuator assembly according to claim 7 wherein the sleeve extends through a central opening in the first latching plate.

9. The actuator assembly according to claim 7 wherein the tolerance spring compresses between a back portion of the second plunger and a front flange on the sleeve.

10. The actuator assembly according to claim 7 further comprising a drive rod rigidly secured to the first plunger and extending through the sleeve, an opening in the second plunger and an opening in the second latch plate.

11. The actuator assembly according to claim 10 wherein the drive rod is coupled to a switch.

12. The actuator assembly according to claim 11 wherein the switch is a vacuum interrupter.

13. A switch assembly comprising:

an actuator assembly including a first actuator having a first magnetically actuated plunger and a first latching plate, the first plunger operable to be magnetically latched to the first latching plate, and a second actuator coupled to and axially aligned with the first actuator, the second actuator including a second magnetically actuated plunger, a second latching plate, a sleeve positioned within and extending from the second plunger and being rigidly secured to the first plunger, and a tolerance spring wrapped around the sleeve, the second plunger operable to be magnetically latched to the second latching plate, wherein latching of the second plunger causes the tolerance spring to compress and provide additional latching force of the first plunger to the first latching plate;

a switch; and a drive rod coupled to the actuator assembly and the switch, the actuator assembly moving the rod to open and close the switch.

14. The switch assembly according to claim 13 wherein the switch is a vacuum interrupter.

* * * * *